(12) United States Patent
Liao et al.

(10) Patent No.: US 7,154,485 B2
(45) Date of Patent: Dec. 26, 2006

(54) TOUCH PANEL MODULE

(75) Inventors: Peter Liao, Jhongli (TW); Chih-Shin Lin, Jhongli (TW)

(73) Assignee: E Turbotouch Technology, Inc., Taoyuan (TW)

( * ) Notice: Subject to any disclaimer, the term of this patent is extended or adjusted under 35 U.S.C. 154(b) by 609 days.

(21) Appl. No.: 10/689,023

(22) Filed: Oct. 21, 2003

(65) Prior Publication Data

US 2005/0083309 A1    Apr. 21, 2005

(51) Int. Cl.
*G09G 5/00* (2006.01)

(52) U.S. Cl. ............... 345/173; 361/760; 361/785; 439/540.1

(58) Field of Classification Search ........ 345/156, 345/173, 205, 206; 361/748, 760, 784, 785; 439/540.1; 257/685, 723
See application file for complete search history.

(56) References Cited

U.S. PATENT DOCUMENTS

| | | | |
|---|---|---|---|
| 5,650,916 A * | 7/1997 | Osaki et al. | 361/785 |
| 6,707,684 B1 * | 3/2004 | Andric et al. | 361/785 |
| 6,707,689 B1 * | 3/2004 | Momota et al. | 361/785 |
| 6,711,025 B1 * | 3/2004 | Ho et al. | 361/785 |
| 2002/0065001 A1 * | 5/2002 | Sun | 439/630 |

* cited by examiner

*Primary Examiner*—Regina Llang
(74) *Attorney, Agent, or Firm*—Birch, Stewart, Kolasch & Birch, LLP

(57) ABSTRACT

A touch panel module includes a touch unit and a memory unit jointly connecting to a connection socket through buses to become an integrated single module. The connection socket has another end connecting to a command unit through another bus thereby to provide a common memory function.

17 Claims, 6 Drawing Sheets

TOUCH PANEL MODULE

FIELD OF THE INVENTION

The present invention relates to a touch panel module mainly for transforming touched points on the touch panel from users to instruction codes that are input into a computer host to process instruction-related operation.

BACKGROUND OF THE INVENTION

Touch is a third communicating medium to computers besides visual and hearing senses. With growing applications of the computer and constant increasing of computer processing data, merely relying on keyboard and mouse to obtain data and using screen to output data is too slow. The continuous developments of sensor technologies have made sensor a great communication tool between human being and the computer.

Touch panel is the prototype of touch human-computer interface. Conventional computer input devices such as keyboard and mouse are too complex for computer novices. They become a hindrance for promoting the computer to a wider population. Research reports indicate that the most natural reaction of human being is directional. Thus touch panel was developed to address this need. It is a humanized input interface that enables users to directly select required function on the picture with hands or touch pens without instructions and tutoring. Hence in is widely applied, such as eBook, GPS, PDA, WebPhone, Mini notebook, Web Pad, Hand-held PC, etc.

Refer to FIGS. 1 and 2 for the conventional structure of the touch panel. The touch panel is a glass panel consisting of a conductive glass plate and a conductive film. When users touch the touch panel, the instruction is input by writing. By slightly touching a highly sensitive touch panel 1, it generates a detection signal corresponding to the touch action. The detection signal is transferred to a command unit 41, and a preset process stored in a memory unit 2 is executed according to the detection signal retrieved from the command unit 41 to form a execution instruction 411 which requests and controls a computer host 5 to operate. According to the present architecture, the memory unit 2 and the command unit 41 may be integrated to form a controller 4. The touch panel module is composed of the touch unit 1 and the controller 4, and is connected to the computer host 5 through a flat cable 3.

The memory unit 2 is a non-volatile readable and writable read only memory (EEPROM). It is a storage for storing data in normal conditions. And it can store data for a long period of time without losing even the power supply is cut off. The data stored in the memory 2 may be altered whenever desired. It also has memory function. For instance, PDA now being used allows telephone number and data to be changed whenever needed, or a SIM card in the mobile phone also has the same effect. The memory function of the memory unit 2 is different depending on different touch input signals of the touch unit 1. The touch unit 1 and the memory unit 2 have to share the same memory function. When the touch unit 1 is adopted, the mating controller 4 has to be coupled together. If the touch unit 1 of one brand is used, and the controller 4 of other brand is adopted; or the controller 4 of one brand is used, and the touch unit of other brand 1 is adopted, the touch unit 1 and the controller 4 could be not compatible and result in different memory function. Erroneous instruction output or not recognizable signals may be generated. In other words, unless equipped with the same memory function, the touch panel module cannot be used effectively. As every vendor provides different functions for its own products, the functions provided by the controller 4 also are different. Hence at present, the general procurement practice is to purchase the touch unit 1, then specifies the controller 4. As a result, how to integrate the design of a common memory function to enable vendors to specify the controller 4 is a major issue pending to be resolved. In view of the aforesaid disadvantages, the invention aims at providing an improved touch panel module to overcome the drawbacks set forth above.

SUMMARY OF THE INVENTION

The touch panel module according to the invention mainly jointly connect a touch unit and a memory unit through flat cables to a connection socket to become a single module. The connection socket has another end connecting to a command unit through another bus. The touch panel module thus constructed has a common memory function.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
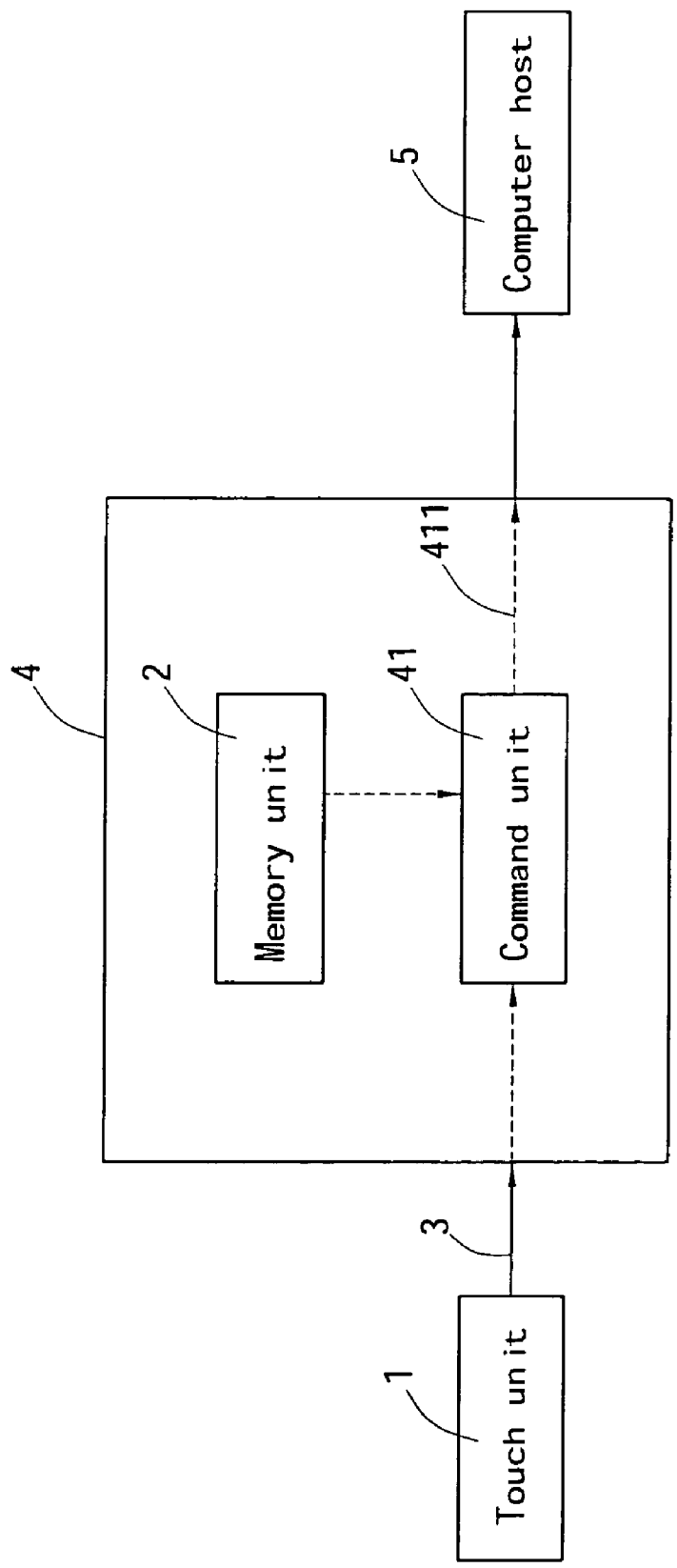
FIG. 1 is a block diagram of the structure and flow of a conventional touch panel module.
Figure 2:
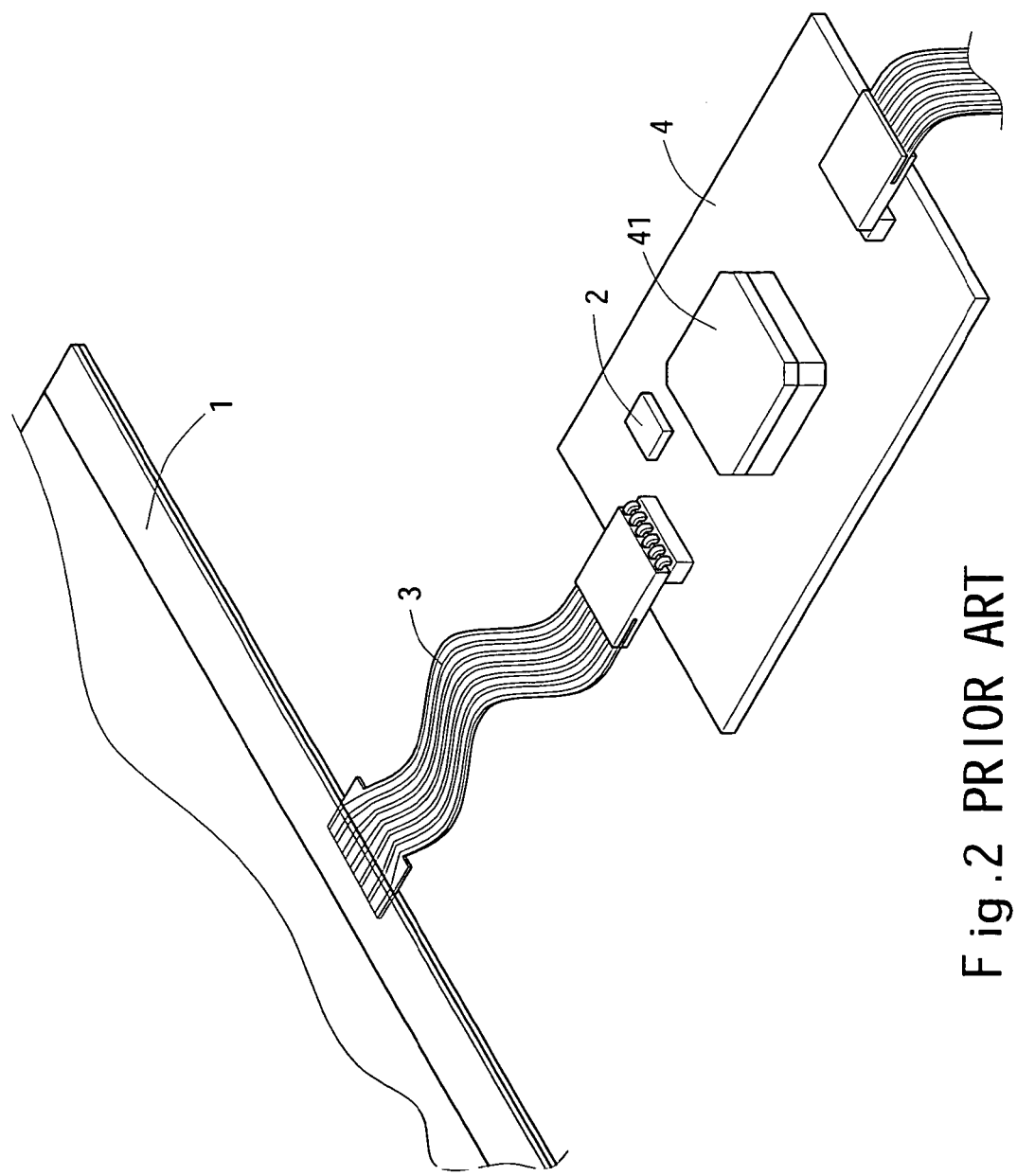
FIG. 2 is a schematic view of the structure of a conventional touch panel module.
Figure 3:
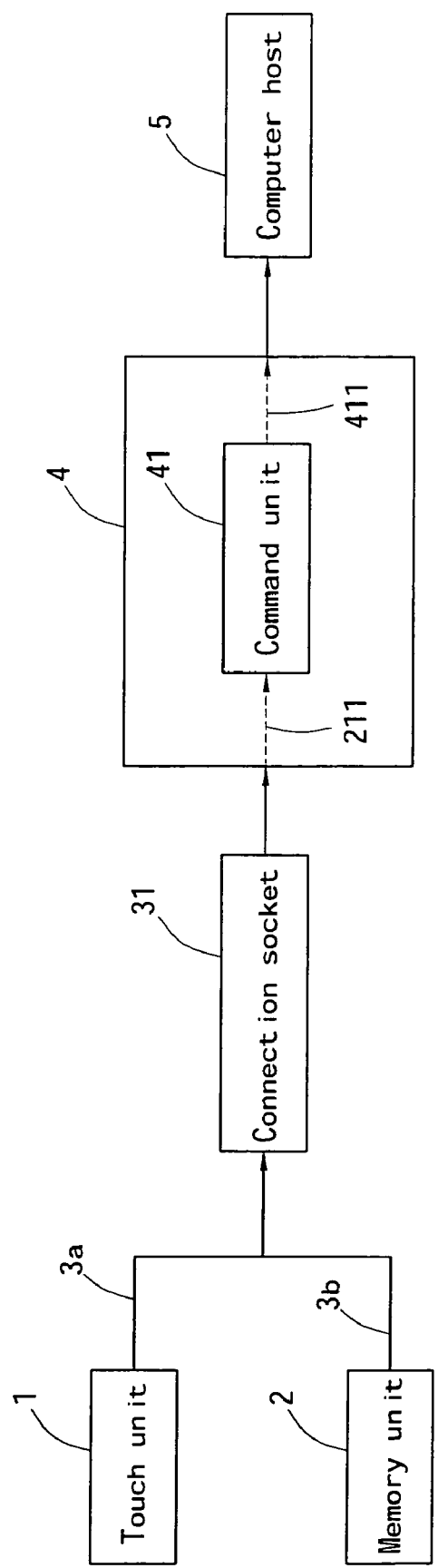
FIG. 3 is a block diagram of the structure and flow of the present invention.
Figure 4:
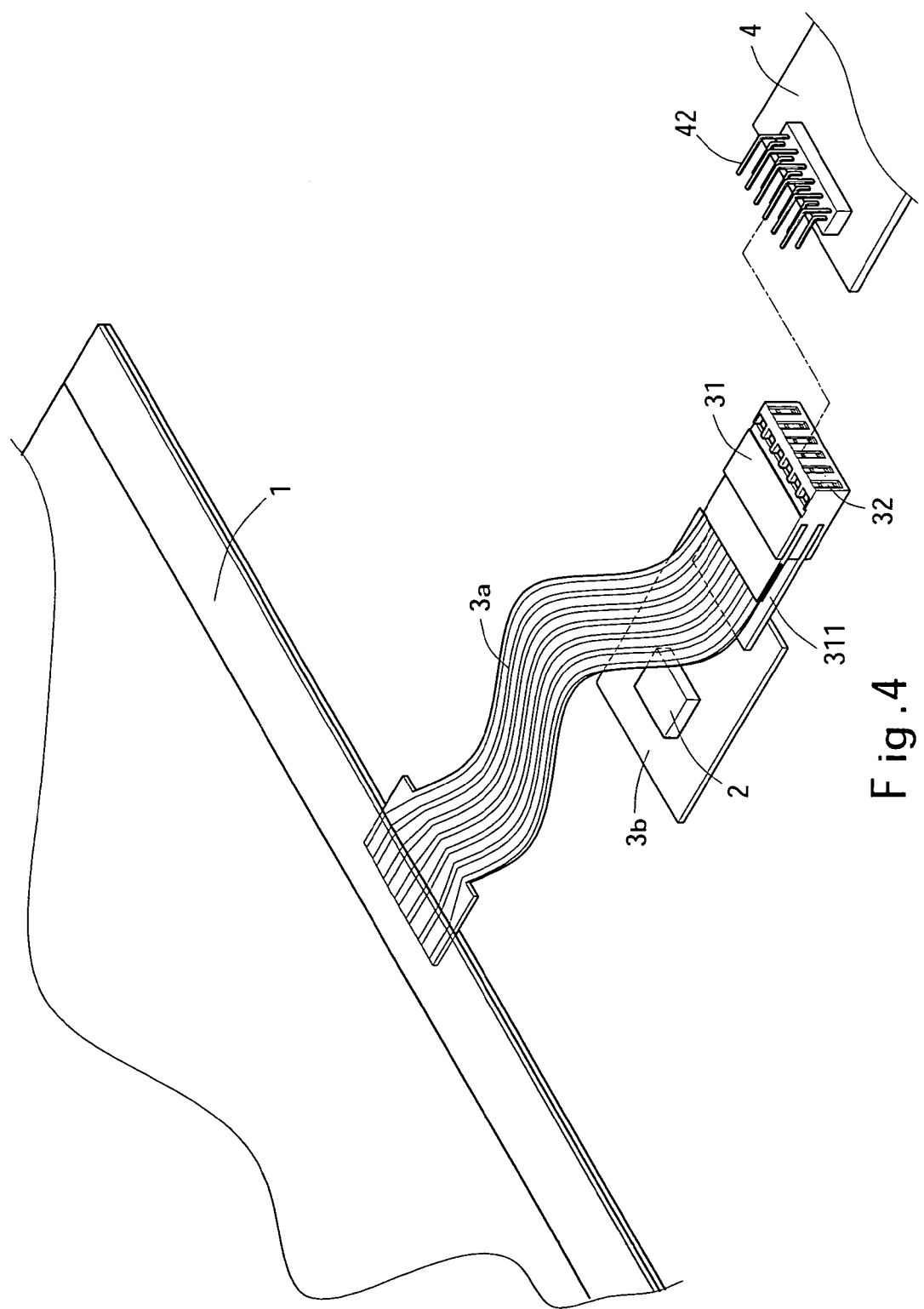
FIG. 4 is a schematic view of the structure of the present invention.
Figure 5:
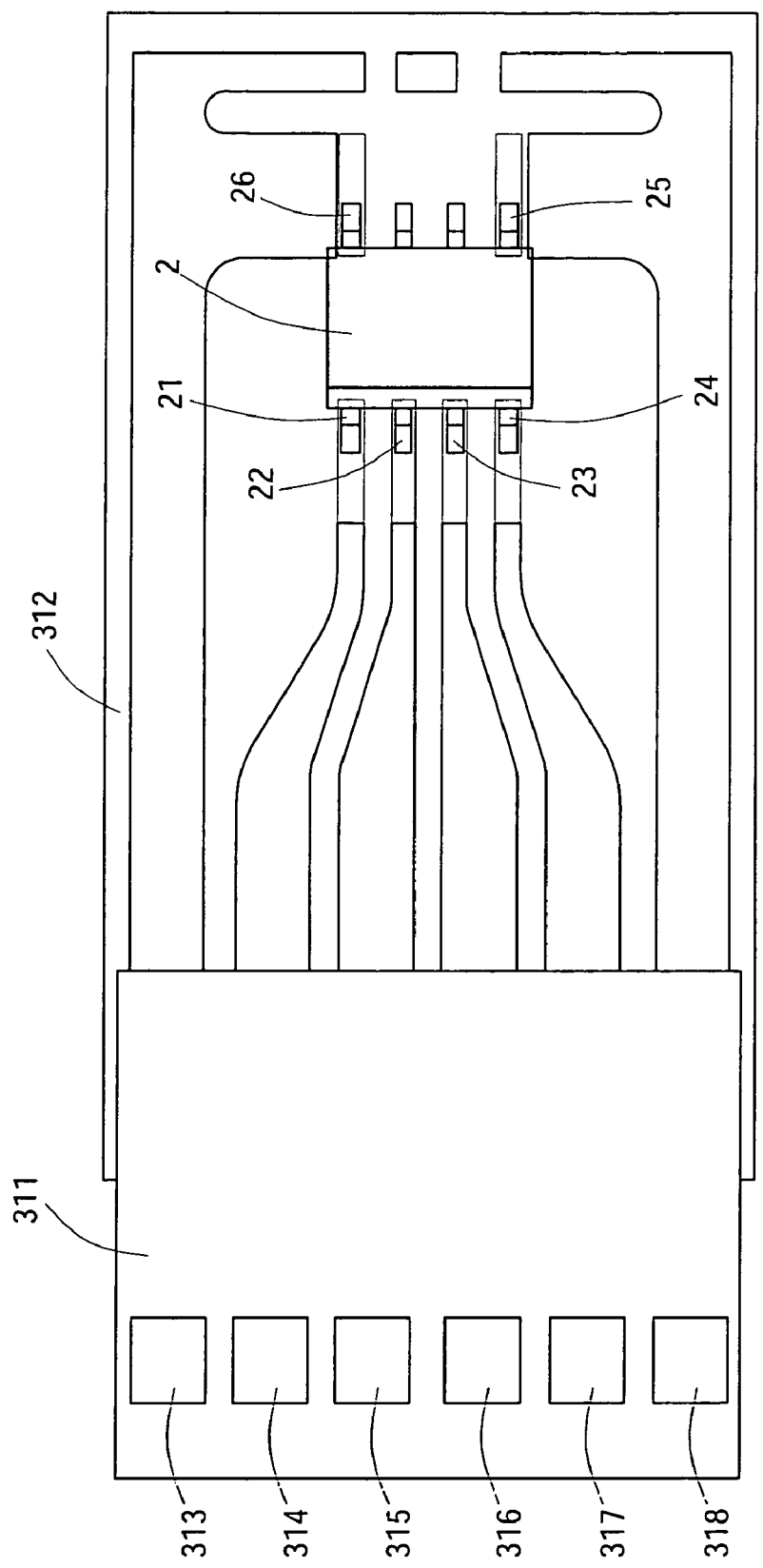
FIG. 5 is a schematic circuit layout of the memory unit according to the invention.

Please referring to FIGS. 3, 4 and 5, the tough panel module according to the invention includes a touch unit 1 for receiving touches from users and generating touch signals, a memory unit 2 for aiding the touch signals and storing and transforming the touch signals to command signals, and a command unit 41 for receiving the command signals and transferring to a computer host 5 to execute operations. The command unit 41 is located in a controller 4. The touch panel module receives input signals after users touch the panel and controls the operation of the computer host 5. The touch unit 1 and the memory unit 2 are jointly connected to a connection socket 31 through pliable or hard buses 3a and 3b to become a single module. The connection socket 31 has another end connecting to the command unit 41 through another bus 3.

The touch unit 1 mainly includes a touch panel to receive touch signals from users. When a user slightly touches the touch unit 1, it immediately generates the touch signal and transfers to the command unit 41 (the command unit 41 may be a memory unit module, a logic unit module, a single chip set module, a multiple chip sets module or a digital signal processing module). The memory unit 2 aids the memory touch signal and transforms the touch signal to execution instructions 411 (the memory unit 2 may be the memory unit module, the logic unit module, the single chip set module, the multiple chip sets module or the digital signal processing module). The touch unit 1 and the memory unit 2 are jointly connected to a connection socket 31 through buses 3a and 3b to become a single module. The bus 3b of the memory unit 2 includes an upper bus 311 and a lower bus 312 for soldering on the memory unit 2. The lower bus 312 includes a middle connection zone and two lateral connection zones according to the pins of the memory unit 2. The upper bus 311 has connection points 313, 314, 315, 316, 317, and 318 corresponding to the middle connection zone and the two lateral connection zones. The memory unit 2, besides being connected to the connection socket 31 through the upper bus 311, may also have the upper bus 311 formed in gold fingers for directly inserting into the connection socket 31 (as shown in FIG. 4). The memory unit 2 does not lose the input signals due to absent of power supply. The input signals written from the touch unit 11 follow an established sequence stored in the memory unit 2 to read the execution instructions 411 to the command unit 41. In the embodiment in which the connection socket 31 is a multi-layer connector, another end of the connection socket 31 forms a multi-layer slots 32 for transferring the execution commands 411, and connecting to multi-row insertion pins 42 of the controller 4. Thereby the execution instructions 411 may be securely transferred to the command unit 41 of the memory logic unit module (or a single chip set module). The command unit 41 integrates the command instructions 211 transferred from the integrated memory unit 2 and the execution instructions 411. The bus 3 on another end of the controller 4 is connected to an interface of the computer host 5 and issues related commands to the computer host 5. The command instructions 211 are internal program codes of the command unit 41, and are not lost when the power supply is cut off. The execution instructions 411 are read from the memory unit 2, thus are lost when the power supply is cut off.

Referring to FIGS. 3 and 5, the memory unit 2 is an eight-pin memory module, and requests the command unit 41 to perform operation through three-wire pins. The three-wire pins includes basic pins, namely, a data sequence (SK) pin 22, a data input (DI) pin 23 and a data output pin (DO) 24. They are connected to the connection points 315, 316 and 317. Other three pins are chip set selection (CS) 21, ground (GND) 25 and power supply (VCC) 26, and are connected respectively to the connection points 314, 318 and 313 to form a six-wire circuit layout. The bus 3b of the memory unit 2 includes an upper bus 311 and a lower bus 312 for soldering on the memory unit 2. The lower bus 312 includes the middle connection zone and two lateral connection zones corresponding to the pins of the memory unit 2. The upper bus 311 has connection points 313, 314, 315, 316, 317, and 318 corresponding to the middle connection zone and the two lateral connection zones.

Figure 6:
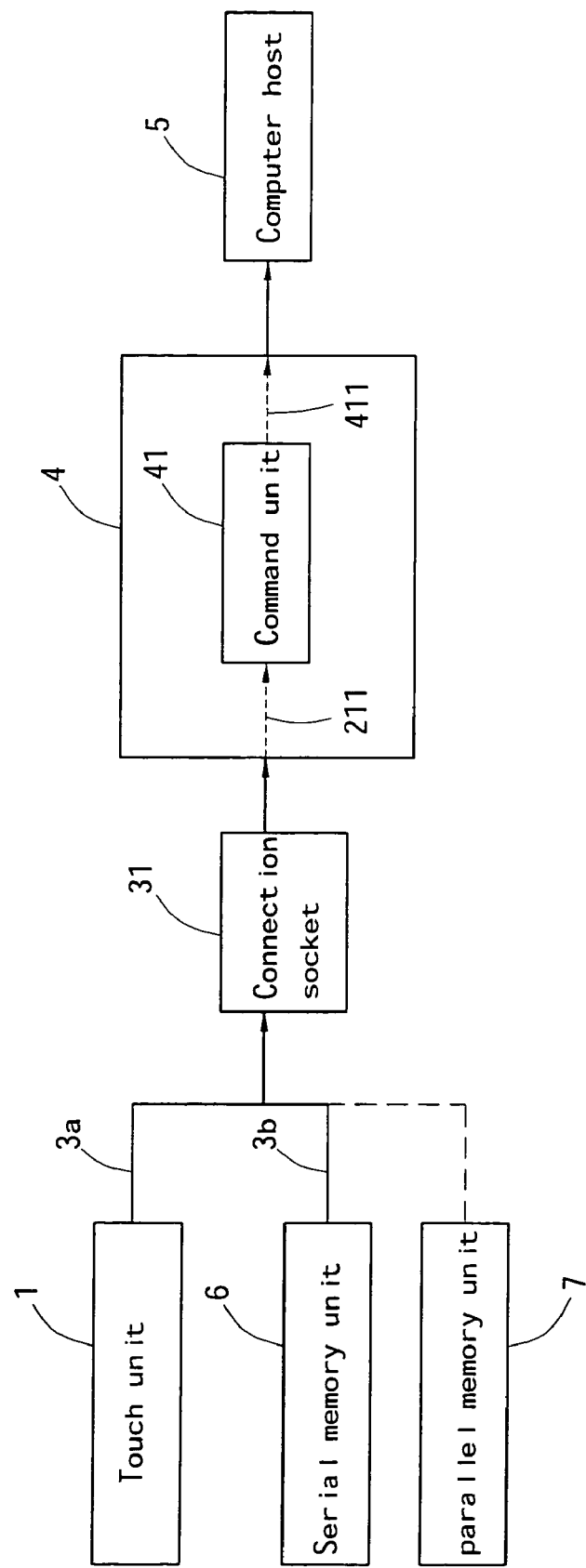
FIG. 6 a block diagram of another embodiment of the present invention.

Refer to FIG. 6 for another embodiment of the invention. The memory unit 2 includes a serial memory unit 6 and a parallel memory unit 7. The serial memory unit 6 is generally being used when there is no a great amount of data being transferred through the touch panel module, while the parallel memory unit 7 is being used when there is a great amount of data to be transferred. The serial memory unit 6 transfers data in the manner of one packet after another, while the parallel memory unit 7 transfers a plurality of packets at the same time and at a speed greater than the serial memory unit 6. Therefore, there are selections for the memory unit 2 according to the amount of the data to be transferred.

What is claimed is:

1. A touch panel module, comprising:
    a touch unit for receiving touches from users and generating touch signals;
    a memory unit for aiding reception of said touch signals and storing and transforming said touch signals to command signals; and
    a command unit for receiving said command signals and transferring to a computer host to execute operations;
    wherein said touch signals are input signals to control said operations of the computer host, comprising said touch unit and said memory unit are jointly connected to a connection socket through buses to form a single module, said connection socket having another end connecting to a command unit through another bus.

2. The touch panel module according to claim 1, wherein said memory unit is a memory unit module.

3. The touch panel module according to claim 1, wherein said memory unit is a logic unit module.

4. The touch panel module according to claim 1, wherein said memory unit is a single chip set module.

5. The touch panel module according to claim 1, wherein said memory unit is a multiple chip sets module.

6. The touch panel module according to claim 1, wherein said memory unit is a digital signal processing module.

7. The touch panel module according to claim 1, wherein said command unit is a memory unit module.

8. The touch panel module according to claim 1, wherein said command unit is a logic unit module.

9. The touch panel module according to claim 1, wherein said command unit is a single chip set module.

10. The touch panel module according to claim 1, wherein said command unit is a multiple chip sets module.

11. The touch panel module according to claim 1, wherein said command unit is a digital signal processing module.

12. The touch panel module according to claim 1, wherein said buses are pliable buses.

13. The touch panel module according to claim 12, wherein said buses are hard buses.

14. The touch panel module according to claim 1, wherein said connection socket is a multi-layer connector.

15. The touch panel module according to claim 1, wherein said connection socket has one end forming a multi-layer inserting slots for connecting to said command unit.

16. The touch panel module according to claim 15, wherein said command unit is located in a controller which has multi-layer pins corresponding to said multi-layer inserting slots.

17. The touch panel module according to claim 1, wherein said buses of said memory unit include an upper bus and a lower bus for soldering on said memory unit, said lower bus including a middle connection zone and two lateral connection zones corresponding to pins of said memory unit, said upper bus having connection points corresponding to said middle connection zone and said two lateral connection zones.

* * * * *